United States Patent [19]
Mark et al.

[11] Patent Number: 5,735,610
[45] Date of Patent: Apr. 7, 1998

[54] LINEAR GUIDE

[75] Inventors: Damon Mark, Ann Arbor; Chris Seitz, Gregory; Gene Sloan, Royal Oak, all of Mich.

[73] Assignee: Machine Systems, Ltd., Ann Arbor, Mich.

[21] Appl. No.: 782,315

[22] Filed: Jan. 15, 1997

Related U.S. Application Data

[60] Provisional application No. 60/020,100, Jun. 19, 1996.

[51] Int. Cl.$^6$ ...................................................... F16C 29/02
[52] U.S. Cl. ...................................................... 384/42; 384/41
[58] Field of Search .................................. 384/42, 26, 37, 384/41

[56] References Cited

U.S. PATENT DOCUMENTS

| | | | |
|---|---|---|---|
| 1,798,257 | 3/1931 | Hansen | 384/42 |
| 4,170,180 | 10/1979 | Houston | 105/225 |
| 4,253,709 | 3/1981 | Teramachi | . |
| 4,333,404 | 6/1982 | Kleykamp | 105/225 |
| 4,756,630 | 7/1988 | Teeslink | 384/42 X |
| 4,784,068 | 11/1988 | Burke | 105/418 |
| 4,944,606 | 7/1990 | Lindsey et al. | 384/42 |
| 4,978,233 | 12/1990 | Stotzel et al. | 384/42 X |
| 5,143,454 | 9/1992 | Morita | 384/42 X |
| 5,149,204 | 9/1992 | Tennichi | 384/15 |
| 5,181,780 | 1/1993 | Morita | 384/42 X |
| 5,217,308 | 6/1993 | Schroeder | 384/45 |
| 5,275,492 | 1/1994 | Shirari | 384/15 |
| 5,297,873 | 3/1994 | Komiya | 384/45 |
| 5,325,783 | 7/1994 | Vogel | 74/424.8 R |
| 5,358,338 | 10/1994 | Komiya | 384/45 |
| 5,489,254 | 2/1996 | Lob | 384/454 |

FOREIGN PATENT DOCUMENTS

| | | | |
|---|---|---|---|
| 4334611 | 4/1994 | Germany | 384/42 |
| 203619 | 7/1992 | Japan | 384/42 |

*Primary Examiner*—Thomas R. Hannon
*Attorney, Agent, or Firm*—Harness, Dickey & Pierce, P.L.C.

[57] ABSTRACT

A linear guide assembly which includes a slide body that is moveably supported on a guide rail by a non-rolling bearing insert. A channel extends longitudinally through the body and the guide rail is received in the channel. The bearing insert facilitates longitudinal movement of the body along the rail. The nature of the mounting of the bearing insert to the body in the channel is such that the bearing insert can be readily removed from the body when excessively worn and replaced without also requiring replacement of the body.

19 Claims, 4 Drawing Sheets

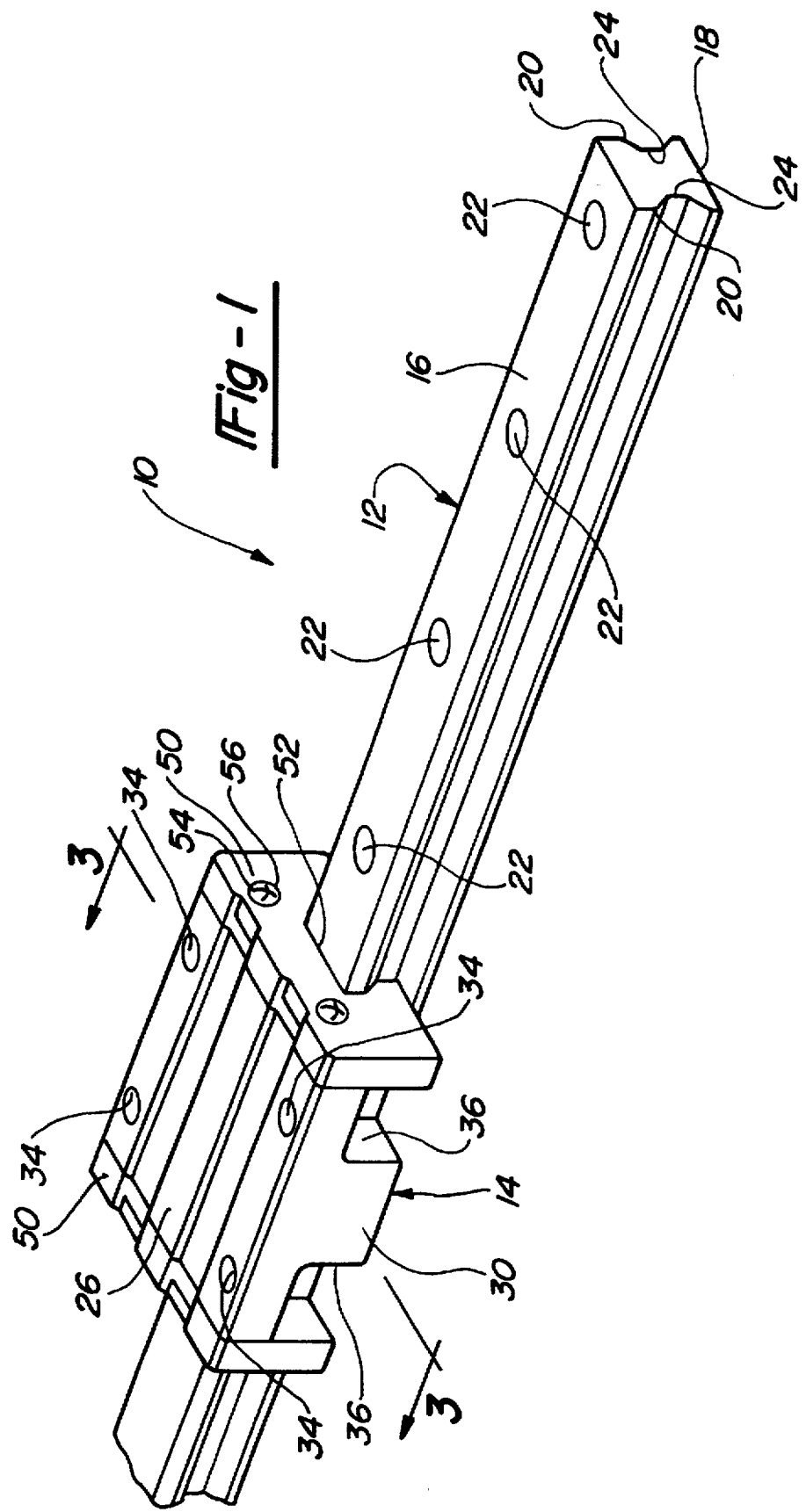

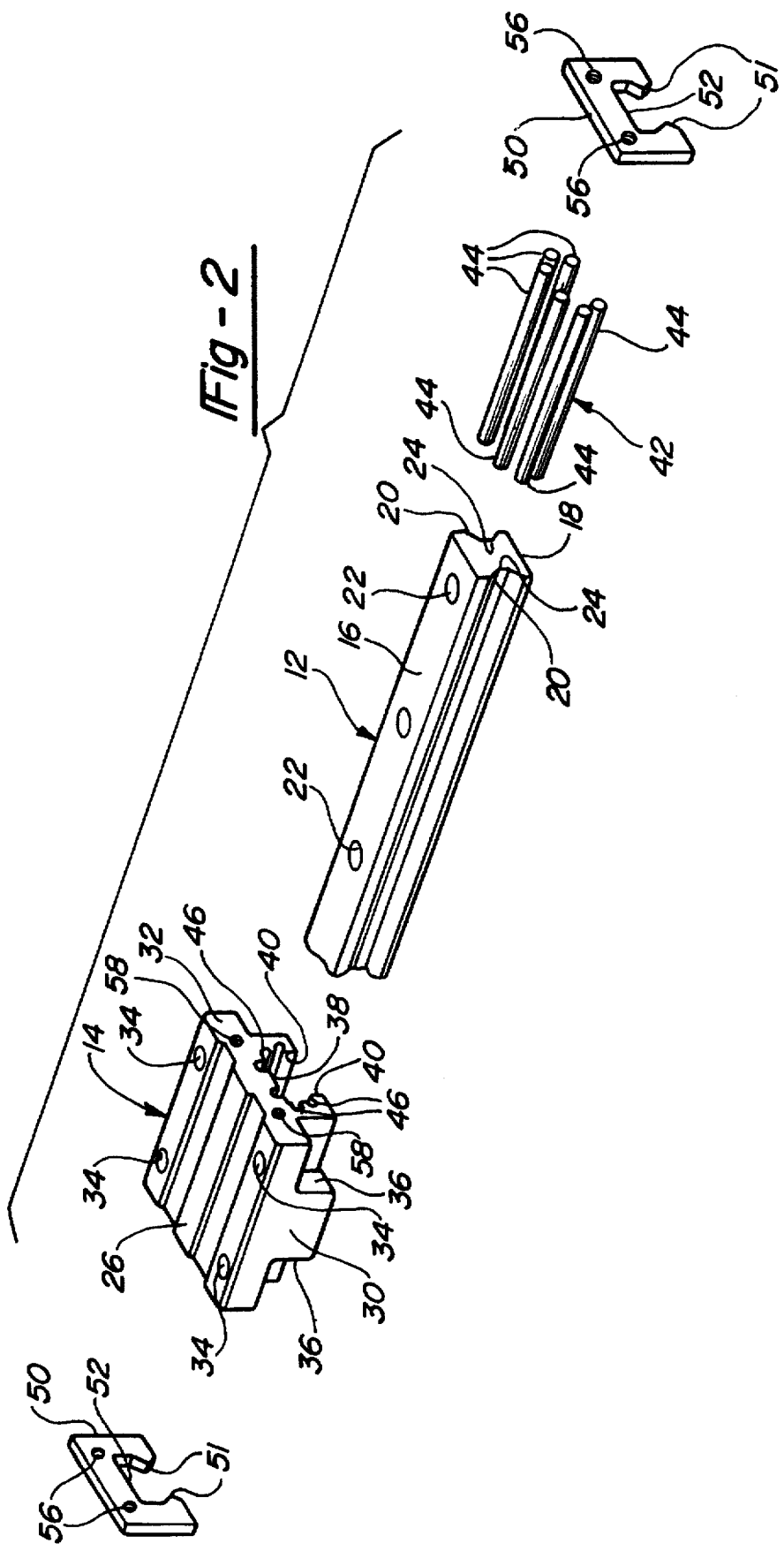

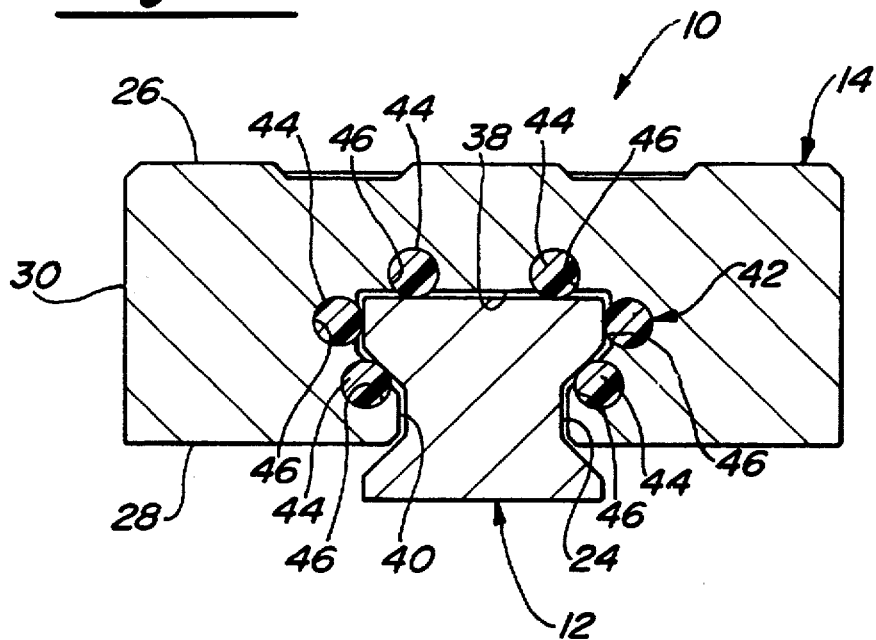
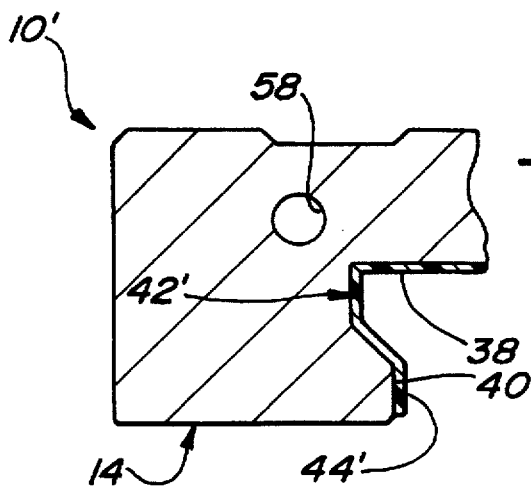
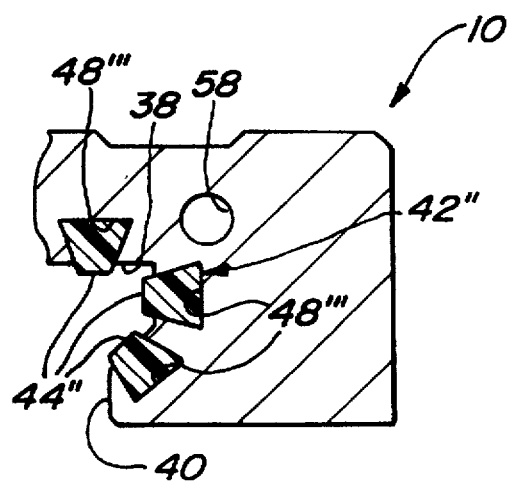

LINEAR GUIDE

CROSS REFERENCE TO RELATED APPLICATION

This application claims the benefit of Provisional Application Serial No. 60/020,100 filed Jun. 19, 1996.

BACKGROUND OF THE INVENTION

1. Field of the Invention

The present invention relates to linear guides having a slide body and a guide rail. More specifically, the present invention relates to a bearing portion on a slide body which can be replaced independently of the slide body.

2. Description of the Prior Art

Linear motion guides are an important component in the construction of automated and other equipment. The linear motion guide (hereinafter just "linear guide") provides for high precision as a piece of equipment, robotic arm, or workpiece is linearly moved back and forth over a relatively long distance. Since each linear guide has only a single degree of freedom, longitudinally along its guide rails, multiple linear guides may be used in combination to provide additional degrees of freedom for the moving of the equipment.

Generally, linear guides have two primary components, a track (or guide rail) and slide body (or slider). The slider and track are designed so that the slider mounts and moves along the track without play or backlash. This is achieved by employing a bearing mechanism between the two.

In one variety of prior linear guides, recirculating ball bearings are captured within the slider and permitted to contact a bearing race formed in the rail. Such systems are relatively costly to produce. When worn, the construction of the recirculating ball bearing slider is such that, at a minimum, the entire slider must be replaced and, more typically, both the slider and rail. It is not feasible to merely replace the ball bearings because of the wear in the raceway where the bearings contact the slider and the rail.

Another type of linear guide actually eliminates the use of recirculated ball bearings while still providing the necessary low sliding friction between the slider and the rail. In this type of linear guide, a bearing material is permanently bonded to the slider so as to provide a contact interface between the slider and the rail. One material used to form these bearing surfaces is polytetrafluorethylene (PTFE). Such a design is generally considered to be maintenance free in that there is no need for wet lubricants since the PTFE provides a built-in and permanent lubrication. However, once the bearing surface has become excessively worn, the entire slider must still be replaced.

In view of the foregoing limitations and shortcomings of the prior art devices, as well as other disadvantages not specifically mentioned above, it should be apparent that there still exists a need in the art for an improved linear guide.

It is therefore a primary object of this invention to fulfill that need by providing a linear guide with a replaceable bearing element.

Another object of the present invention is to provide a linear guide which eliminates the use of roller elements in the bearing mechanism.

A further object of the present invention is to provide a linear guide in which the bearing element is readily removable from the slider when worn and replaceable without the need for replacing the slider.

Another object of the present invention is to provide a linear guide in which a series of replaceable inserts or members form the bearing interface between the slider and the rail.

SUMMARY OF THE INVENTION

Briefly described, these and other objects are accomplished according to the present invention by providing a linear guide having a readily removable and replaceable, non-rolling bearing element. This replaceable bearing element is herein referred to as an insert. As with prior linear guides, the linear guide of the present invention includes a slide body which is slidably mounted to a guide rail. However, in the present invention the slider is slidably supported on the guide rail by the readily replaceable bearing insert.

The slider of the present invention includes a body portion having a top, a bottom, opposing sides and opposing ends. Portions of the body define a channel that extends longitudinally through the length of the body, between the opposed ends. The channel has its open side generally in the direction of the bottom of the body and exhibits a cross-sectional shape which is intended to allow the rail to be received therein. The guide rail itself also has opposing ends that define its length, which is greater than the length of the body. The interaction between the cross-sectional shape of the body and the rail results in the movement of the body being restricted to a single degree of freedom longitudinal along the rail. Lateral or vertical movement of the body relative to the rail is inhibited.

The non-roller bearing insert is a bushing, sliding or friction type bearing made from one of several preferred polymeric materials having a low coefficient of friction, high load capacity and good wear characteristics. The bearing element material therefor facilitates the longitudinal sliding movement of the body on the rail.

In one embodiment of the present invention, the bearing element is formed by a single unitary member and in another embodiment by series of individual, elongated members. Both types of members are received and captured in portions of the channel in the slide body. The individual members are mounted in recesses which are themselves further defined in the channel. These recesses restrict removal of the members to a longitudinal direction. End caps, mounted to the ends of the body, further retain the members with the body.

By providing the bearing element as outlined above, only the elongated members themselves engage the rail as the body slides therealong and wear of the slide body is eliminated. Advantageously, when the individual members of the bearing element become worn from use, the end caps are removed from the slide body, the members are longitudinal withdrawn out of the recesses, and new elongated members are inserted to replace the worn ones. No replacement of the slide body or the rail is needed or required. To its benefit, the present invention therefore provides a cost effective alternative to prior linear guides, both in terms of initial cost and maintenance over its lifetime.

Additional benefits and advantages of the present invention will become apparent to those skilled in the art to which the present invention relates from the subsequent description of the preferred embodiments and the appended claims, taken in conjunction with the accompanying drawings.

BRIEF DESCRIPTION OF THE DRAWINGS

FIG. 1 is a perspective view of a linear guide embodying the principles of the present invention;

FIG. 2 is an exploded view of a linear guide according to one embodiment of the present invention;

FIG. 3 is a sectional view taken substantially along line 3—3 in FIG. 1 illustrating various features of the present invention;

FIG. 4 is a sectional view similar to that seen in FIG. 3 illustrating a second embodiment of the present invention;

FIG. 5 is a sectional view similar to that seen in FIGS. 3 and 4 and further illustrating a third embodiment of the present invention.

DETAILED DESCRIPTION OF THE PREFERRED EMBODIMENT

Figure 6:
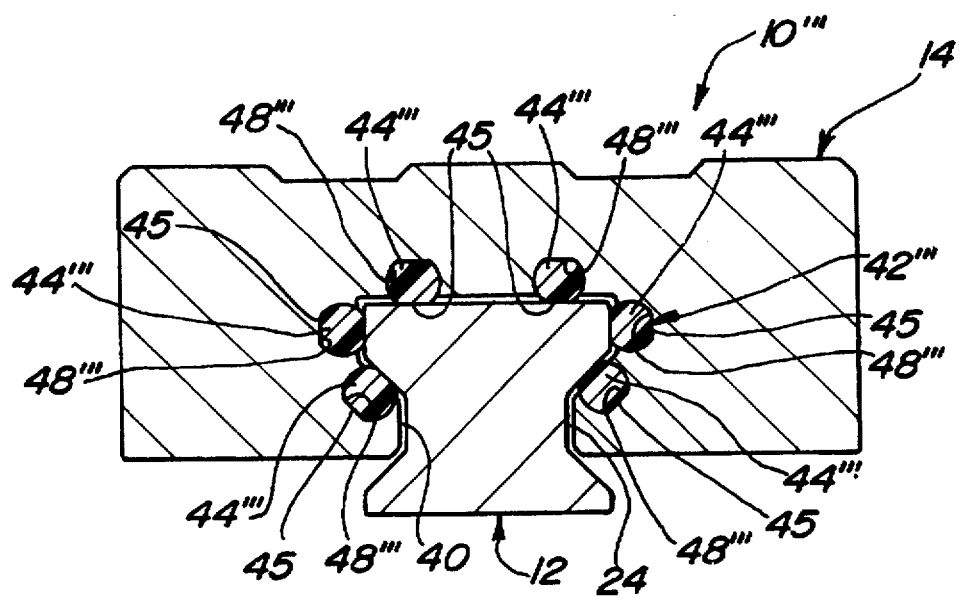
FIG. 6 is a sectional view similar to that seen in FIGS. 3-5 which illustrates a fourth embodiment of the present invention.

Referring now in detail to the drawings, there is shown in FIG. 1 a linear guide, generally designated at 10, embodying the principles of the present invention. The linear guide 10 principally includes a guide rail 12 on which is supported a slide body 14. Both the rail 12 and body 14 are anticipated as being constructed out of aluminum, steel or another suitable material.

The guide rail 12 is longitudinal member and includes a top surface 16, a bottom surface 18, and opposing side surfaces 20. Vertical bores 22 are provided in the guide rail 12, extending from the top surface 16 to the bottom surface 18, to enable securement of the guide rail 12 to a suitable base or table by fasteners such as screws (not shown). The bores 22 are provided in a manner which will allow the heads of the fasteners to be counter sunk beneath the top surface 16. In this way, the fasteners will not interfere with movement of the slide body 14 along the guide rail 12.

The side surfaces 20 or sides of the guide rail 12 are profiled such that inclusions 24 are directed generally toward one another inwardly of the guide rail 12. The inclusions 24 are provided in the shape of trapezoidal indentations into the sides 20 of the rail. As further discussed below, the inclusions 24 cooperate with protruding portions of the slide body 14 to retain the slide body 14 on the rail 12 and limit relative movement between the two to an axial or longitudinal direction along the rail 12.

Referring now to FIGS. 2 and 3, the slide body 14 is generally a rectangular block shape and includes a top surface 26, a bottom surface 28, opposed side surfaces 30 and opposed end surfaces 32. The top surface 26 forms a generally planar surface to which at least a portion of the component to be guided by the linear guide 10 is mounted. To facilitate this mounting, mounting bores 34 are machined or otherwise formed vertically through the top surface 26 and into the slide body 14. Bolts or other fasteners (not shown) can be extended through the component and through the mounting bores 34 allowing a nut or other engagement mechanism (not shown) to engage the opposing end of the fastener. If desired, the bore 34 may be tapered to provide a positive engagement with the fastener, with or without further engagement with the nuts. Cut-outs 36, axially aligned with the mounting bores 34, are formed in the slide body 14 to recess the nuts within the exterior dimensions of the slide body 14. The cut-outs 36 are illustrated as extending upward from the bottom surface 28 and inward from the side surfaces 30 and end surfaces 32 to locate the cut-outs 36 generally in the four corners of the slide body 14. Obviously, alternative locations and configurations, or even complete elimination thereof of the cut-outs 36 could be employed depending on the specific design criteria of the linear guide 10 and its intended application.

Formed longitudinally through the slide body 14 and generally being open in the direction of the bottom surface 28, is a channel 38 whose cross-sectional shape generally corresponds to the cross-sectional shape of the guide rail 12. As seen in FIG. 3, the cross-sectional shape of the channel 38 is slightly greater than but conforms to the cross-sectional shape of the guide rail 12. To achieve this conformity, the channel 38 is also defined with a pair of generally opposed protrusions 40 which extend generally into the inclusions of the guide rail 12. Adjacent to the bottom surface 28, the protrusions 40 therefore define a necked-down entrance area into the channel 38 and this cooperates with the channel to inhibit vertical and lateral movement of the body 14 relative to the rail 12. Proceeding into the channel 38, beyond the protrusions 40 and the necked-down entrance, the channel 38 increases in width. This also corresponds to the rail 12.

While the above discussed shapes of the rail and the channel have been detailed with some particularity, it will be understood that these shapes can be provided in numerous alternative configurations. All such shapes are therefore considered to be equivalents of the illustrated shape, so long as the above general operating parameters of the linear guide are met.

To support the slide body 14 on the guide rail 12, a bearing element 42 is located within the channel 38. In the embodiment of FIGS. 2 and 3, the bearing element 42 is generally defined by a series of individual bearing inserts 44 (illustratively six in the figures) which are cylindrical in shape and exhibit circular cross-sections.

To mount the bearing inserts 44 in the channel 38 of the slide body 14, cylindrical grooves 46 are longitudinally machined or otherwise formed in the channel 38 of the slide body 14. The cylindrical grooves 46 are further formed so that their cross-sectional shape defines an incomplete circle in the slide body 14. As the term is used herein, an incomplete circle is meant to define a portion of a circle being greater than a semi-circle but less than a complete circle. Formed in this manner, the cylindrical grooves 46 allow for the bearing inserts 44 to be longitudinally press-fit or inserted into the grooves with a portion of the inserts 44 extending beyond those surfaces of the body 12 which actually define the channel 38. These portions which extend beyond the surfaces that define the channel 38 contact and engage the rail 12. Contact between the two is a surface-to-surface sliding engagement. This provides for a low friction engagement that allows the body 14 to easily slide along the rail 12. The basic operating limits for a linear guide according to the present invention are anticipated to be: load (300-750 lbs./slide body); pressure/velocity level (approximately 7500); and maximum operating temperature (300°-500° F.) up. Obviously, operating parameters beyond the above could similarly be employed.

As seen above, in addition to withstanding the anticipated operating parameters, the material from which the bearing inserts 44 are formed needs to have a low coefficient, good wear capabilities, and not necessarily require wet lubricants. Any material which suitable meets the above criteria therefore constitutes a preferred material of this invention.

One such preferred material is PTFE and particularly a mica-filled PTFE. This material has a very low coefficient of friction (0.10) and exhibits good wear properties. Such a material is commercially available from the Polymer Corporation of Reading, Pa. under the tradename of FLUOROSINT 207.

Another and more preferred material is a bearing grade, has a PV of 7500 and an operating temperature range of over 300° F., extruded polyamide-imide (commercially available from the above source under the tradename of TORLON 4301). The coefficient friction of this material is 0.20, greater than the previously mentioned material, but additional advantages are gained. For example, the operating temperature range of this material is over 500° F. (making the material much stronger at elevated temperatures), the thermal expansion rate of the material is significantly low (allowing for closer tolerances between the parts) and the PV limit (45,000) greatly exceeds the anticipated requirements for the present linear guide 10. To prevent longitudinal disengagement of the inserts 44 of the bearing element 42 from the slide body 14, the ends 32 of the slide body 14 are adapted to receive end caps 50. The end caps 50 are shaped to correspond to the shape of the slide body 14, protrusions 40 and channel 38, but without the formation of the grooves 46 therein. The dimensions of protrusions 51 and the recess 52 in the end caps 50 therefore more closely approximates the shape of the guide rail 12. In this manner, end caps 50 overlap the ends of the bearing inserts 44 of the bearing element 42, trapping the bearing element 42 therebetween. To secure the end caps 50 to the slide body 14, fasteners 54 are inserted through bores 56 defined through the end caps 50 and into receiving bores 58 in the slide body 14. The end caps 50 are also utilized to retain the alternate embodiments of the bearing element 42 which are further described below.

A second embodiment of the present invention is illustrated in FIG. 4. In this embodiment, the bearing element 42' of the linear guide 10' is a unitary bearing insert 44' having an outer dimension and shape which closely conforms to the cross-sectional shape of the channel 38 and an inner dimension and shape conforming to the rail 12. As with the prior embodiment, the bearing insert 44' is inserted longitudinally into the channel 38. Since the bearing insert 44' also conforms to the protrusions 40 of the slide body 14, the bearing insert 44' can only be longitudinally inserted and removed from the channel 38.

A third embodiment of the linear guide 10" is illustrated in FIG. 5. In this embodiment, the bearing element 42" is again comprised of individual bearing inserts 44". These bearing inserts 44", however, are generally trapezoidal in cross-sectional shape and are longitudinally press-fit or inserted into trapezoidal grooves 48" defined in the channel 38. The grooves 48" are formed such that the base of the trapezoid is defined in the interior of the body 14, away from the channel 38, preventing removal of the bearing inserts 44" other than by longitudinal withdrawal from the grooves 48". As with the first embodiment, the bearing inserts 44" extend out of the body 14 a distance beyond the channel 38 so as to contact the rail 12 and slidably support the body 14 thereon.

A fourth embodiment of the bearing element 42 is illustrated in FIG. 6 and includes individual inserts 44"', similar to the first and third embodiments. In this fourth and most preferred embodiment of the linear guide 10"', the cross-sectional shape of the inserts 44"' is similar to that of the first embodiment, however, a pair of opposing flats 45 are formed in the inserts 44"' and the grooves 48"'. During use, one of the flats 45 contacts the rail 12. This design enjoys the ability of the worn inserts being removed from the grooves 48"', rotated 180°, and then reinserted into the grooves 48"', allowing the inserts to be used twice before replacement.

Additional alternative embodiments of the present invention can be seen as having cross-sectional shapes other than those mentioned above. For example, bearing inserts could be provided with a hexagonal, octagonal, elliptical, I-beam or other cross-sectional shape and be received in a corresponding groove defined in the channel 38. Some of these designs enjoy the ability of enabling the insert being removed from the groove when worn, rotated 180° and then re-inserted into the groove with a non-worn surface now contacting the rail 12. This allows the inserts to be used twice (more in the case of hexagonally and octagonally shaped cross-sectional inserts) before having to be completely replaced.

As an alternative mechanism for retaining the various embodiments of the bearing element 42 within the channel 38, either as an alternative to the end caps 50 or as an addition thereto, the bearing element 42 may be secured to the slide body 14 by removable fasteners such as screws (not shown) extending through the bearing element 42 and into the slide body 14. Such fasteners would be recessed into the bearing element 42 a sufficient amount so as to prevent contact between the fastener and the guide rail 12 even when the bearing element 42 is severely worn.

While the above description constitutes the preferred embodiment of the present invention, it will be appreciated that the invention is susceptible to modification, variation and change without departing from the proper scope and fair meaning of the accompanying claims.

We claim:

1. A linear guide assembly comprising:

a slide body having a top, a bottom, opposing sides and opposing ends, portions of said body defining a channel extending longitudinally through said body and between said ends;

a guide rail having opposing ends and a cross-sectional shape corresponding to a cross-sectional shape of said channel to permit said rail to be received in said channel;

said body being on said rail and said body longitudinally moveable along said rail while being restricted from laterally and vertically moving relative to said rail;

non-rolling bearing means for facilitating longitudinal movement of said body along said rail, said bearing means mounted to said body; and mounting means located within said channel for removably mounting said bearing means to said body, said mounting means cooperating with said bearing means for vertically and laterally retaining said bearing means relative to said body and permitting removal and replacement of said bearing means independent of replacement of said body.

2. A linear guide assembly as set forth in claim 1 wherein said bearing means is constructed of a polymeric material.

3. A linear guide assembly as set forth in claim 1 wherein said bearing means is constructed of PTFE.

4. A linear guide assembly as set forth in claim 1 wherein said bearing means is constructed of a polyamid-imide.

5. A linear guide assembly as set forth in claim 1 wherein said bearing means includes a plurality of elongated members.

6. A linear guide assembly as set forth in claim 5 wherein said elongated members are round in cross-section.

7. A linear guide assembly as set forth in claim 5 wherein said members are round with opposing flats in cross-section.

8. A linear guide assembly as set forth in claim 5 wherein said elongated members are trapezoidal.

9. A linear guide assembly as set forth in claim 5 wherein said mounting means includes a plurality of longitudinal grooves defined in said portions of said body which define said channel, said elongated members being received in said grooves.

10. A linear guide assembly as set forth in claim 9 wherein said grooves are incomplete circles in cross-section.

11. A linear guide assembly as set forth in claim 9 wherein said grooves are incomplete circles with flats in cross-section.

12. A linear guide assembly as set forth in claim 9 wherein said grooves are trapezoidal in cross-section.

13. A linear guide assembly as set forth in claim 1 wherein said mounting means includes a press-fit engagement between said body and said bearing means.

14. A linear guide assembly as set forth in claim 1 wherein said bearing means is a unitary member having a shape corresponding at least in part to said channel.

15. A linear guide assembly comprising:

a slide body having a top, a bottom, opposing sides and opposing ends, portions of said body defining a channel extending longitudinally through said body between said ends, said body also including a plurality of longitudinal grooves defined in said channel;

a guide rail having a cross-sectional shape corresponding to a cross-sectional shape of said channel, said rail being received within said channel and said body being restricted to longitudinal movement along said rail;

a plurality of elongated sliding bearing members facilitating longitudinal sliding movement of said body along said rail, said bearing members being received in said grooves and being longitudinally insertable and frictionally retained therein, said bearing means and said body having a press-fit engagement therebetween; and retainer means removably attached to said body, said retainer means permitting longitudinal removal and replacement of said bearing members independent of replacement of said body when said retainer means is unattached to said body and preventing longitudinal removal of said bearing members when attached to said body.

16. A linear guide assembly as set forth in claim 15 wherein said retainer means includes at least one end cap mounted to one of said ends of said body, said end cap preventing longitudinal removal of said bearing means.

17. A linear guide assembly as set forth in claim 15 wherein said bearing means includes a plurality of elongated members which are round in cross-section.

18. A linear guide assembly as set forth in claim 15 wherein said bearing means includes a plurality of elongated members which are trapezoidal in cross-section.

19. A linear guide assembly comprising:

a slide body having a top, a bottom, opposing sides and opposing ends, portions of said body defining a channel extending longitudinally through said body between said ends;

a guide rail having a cross-sectional shape corresponding to a cross-sectional shape of said channel, said rail being received within said channel and said body being restricted to longitudinal movement along said rail;

sliding bearing means for facilitating longitudinal sliding movement of said body, said bearing means being removably and insert mounted to said body, said bearing means includes a plurality of elongated members having a cross-section with flats formed thereon and engaging said rail; and retainer means for retaining said bearing means to said body, said retainer means permitting longitudinal removal and replacement of said bearing means independent of replacement of said body.

* * * * *